United States Patent
Zhu et al.

(10) Patent No.: US 8,914,537 B2
(45) Date of Patent: Dec. 16, 2014

(54) METHODS AND APPARATUSES FOR RATE ADAPTATION OF QUALITY OF SERVICE BASED APPLICATION

(75) Inventors: Jing Zhu, Portland, OR (US); Juergen Kreuchauf, San Francisco, CA (US)

(73) Assignees: Intel Mobile Communications GmbH, Neubiberg (DE); Intel Corporation, Santa Clara, CA (US)

(*) Notice: Subject to any disclaimer, the term of this patent is extended or adjusted under 35 U.S.C. 154(b) by 82 days.

(21) Appl. No.: 13/568,165

(22) Filed: Aug. 7, 2012

(65) Prior Publication Data

US 2014/0043975 A1 Feb. 13, 2014

(51) Int. Cl.
*G06F 15/16* (2006.01)
*H04L 12/801* (2013.01)

(52) U.S. Cl.
CPC ............... *H04L 47/10* (2013.01); *H04L 47/11* (2013.01)
USPC ............................ 709/234; 709/235; 370/235

(58) Field of Classification Search
USPC .................... 370/235; 709/234, 235
See application file for complete search history.

(56) References Cited

U.S. PATENT DOCUMENTS

| 7,869,794 | B1* | 1/2011 | Weaver ................ 455/412.1 |
| 2006/0039287 | A1* | 2/2006 | Hasegawa et al. ......... 370/238 |
| 2011/0075582 | A1* | 3/2011 | Sugiyama et al. ......... 370/252 |

OTHER PUBLICATIONS

3GPP TS 24.303 V11.2.0 (Jun. 2012) 3rd Generation Partnership Project; Technical Specification Group Core Network and Terminals; Mobility management based on Dual-Stack Mobile IPv6; Stage 3; (Release 11).

* cited by examiner

*Primary Examiner* — Kenny Lin (57) ABSTRACT

A method, system, and computer program product for identifying network congestion in a communication system. A connection manager identifies a number of packet delay times of a plurality of data packets within the communication system; determines whether the at least one packet delay time meets a threshold; and responsive to the at least one packet delay time meeting the threshold, adjusts a congestion indicator.

18 Claims, 10 Drawing Sheets

METHODS AND APPARATUSES FOR RATE ADAPTATION OF QUALITY OF SERVICE BASED APPLICATION

TECHNICAL FIELD

Aspects of this disclosure relate generally to rate adaptation. In particular, an aspect of this disclosure relates to identifying network congestion in a communication system.

BACKGROUND

User equipment (UE), such as smart phones, tablets, laptops, etc. are increasingly equipped with both WLAN (e.g. Wi-Fi) and 3G (UMTS, LTE) cellular radio (WWAN). A multi-radio UE may connect to Internet over WLAN whenever it is available, and switch to WWAN when performance degradation over WLAN is detected or WLAN is less beneficial for other reasons.

Peak and average data rates and round trip delay times in Up- and in Downlink can significantly differ and/or fluctuate while using these two wireless technologies. During handover scenarios from Wi-Fi to Cellular, a typical Wi-Fi connection such as 802.11g delivers up to 54 Mbps peak data rates over-the-air compared to a typical 3G Rel-7/Cat-14 data rate of 21 Mbps in theory. In reality data rates of 15-20 Mbps on Wi-Fi vs. 5 Mbps on 3G can be seen on TCP/IP throughput level. This data throughput gap in handover scenarios from Wi-Fi to Cellular can result in user experience degradations (audio and/or video stalled or entirely disappeared) during the duration when data flow is given to Cellular until coding rate adaption on application layer was able to compensate.

During mobility scenarios while being on Cellular, the currently achieved throughput and packet delays in uplink and downlink can vary depending on many different factors such as 3g coverage areas, cell load, HSDPA serving cell change, HSDPA/HSUPA (E-DCH) network/cell capabilities, etc. Round trip delays in the Cellular network can vary and depending on the network and signal conditions in the network exceed the maximum what is required to send/receive audio calls or video calls (audio+video).

Therefore, it would be advantageous to have a method, system, and computer program product that addresses one or more of the issues discussed above.

In an aspect of this disclosure, a method for identifying network congestion in a communication system. A connection manager identifies a number of packet delay times of a plurality of data packets within the communication system; determines whether the at least one packet delay time meets a threshold; and responsive to the at least one packet delay time meeting the threshold, adjusts a congestion indicator.

In an aspect of this disclosure, a system is provided for identifying network congestion in a communication system. The system comprises a user equipment configured to identify a number of packet delay times of a plurality of data packets within the communication system; determine whether the at least one packet delay time meets a threshold; and responsive to the at least one packet delay time meeting the threshold, adjust a congestion indicator.

In an aspect of this disclosure, a computer program product comprising logic encoded on a tangible media for identifying network congestion in a communication system. The logic comprising instructions for: identifying a number of packet delay times of a plurality of data packets within the communication system; determining whether the at least one packet delay time meets a threshold; and responsive to the at least one packet delay time meeting the threshold, adjusting a congestion indicator.

BRIEF DESCRIPTION OF DRAWINGS

In the drawings, like reference characters generally refer to the same parts throughout the different views. The drawings are not necessarily to scale. In the following description, aspects of this disclosure are described with reference to the following drawings, in which.

DETAILED DESCRIPTION

The following detailed description refers to the accompanying drawings that show, by way of illustration, specific details and aspects of this disclosure. The word "exemplary" is used herein to mean "serving as an example, instance, or illustration". Any aspect of this disclosure or design described herein as "exemplary" is not necessarily to be construed as preferred or advantageous over other aspects of this disclosure or designs.

Figure 1:
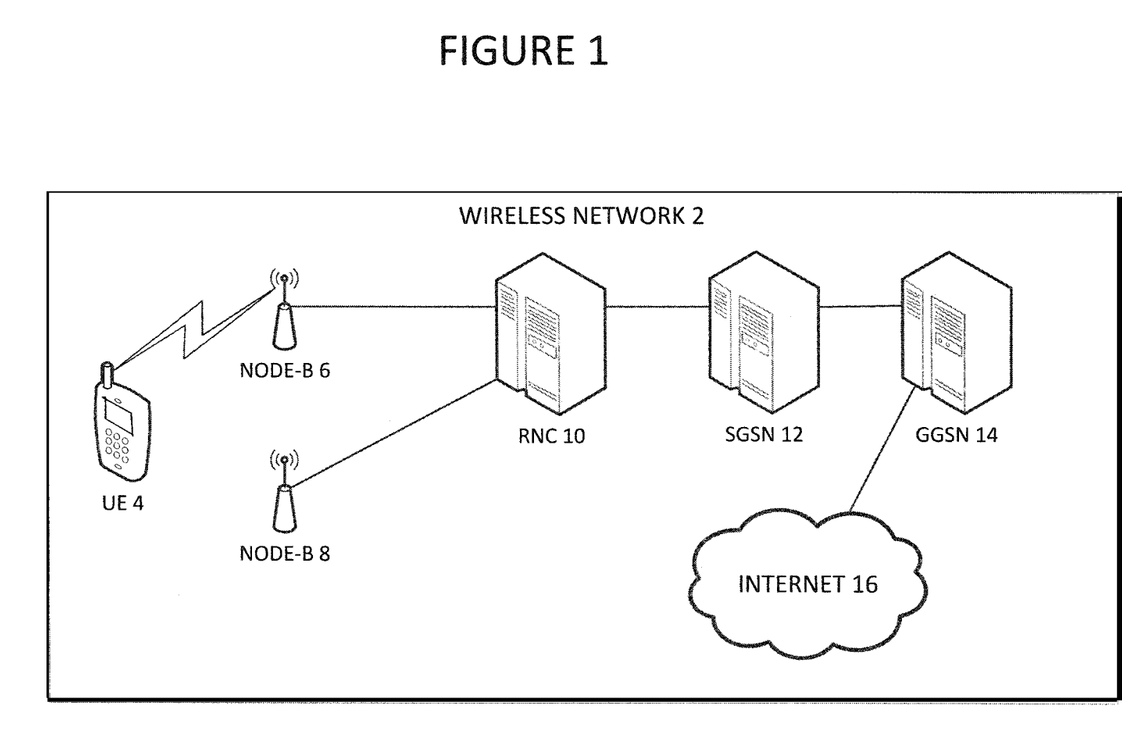
FIG. 1 is an illustration of a wireless network in accordance with an aspect of this disclosure.

FIG. 1 is an illustration of a wireless network in accordance with an aspect of this disclosure. In an aspect of this disclosure, wireless network 2 may be a network implemented with radio signals. In different aspects, various components of wireless network 2 may use wired connections as well as wireless connections. Wireless network 2 may be a wireless wide area network (WWAN). The WWAN may use mobile telecommunication cellular network technologies such as Long Term Evolution (LTE), LTE-Advanced, WiMAX (often called a wireless metropolitan area network or WMAN), UMTS, CDMA2000, GSM, cellular digital packet data (CDPD) and Mobitex to transfer data.

In an aspect of this disclosure, wireless network 2 may include user equipment (UE) 4, Node-B 4, Node-B 8, Radio Network Controller (RNC) 10, Serving General Packet Radio Service Support Node (SGSN) 12, Gateway General Packet Radio Service Support Node (GGSN) 14, and Internet 16. UE 4 transmits and receives information through Node-Bs 6 and 8. In turn, Node-B's forward information to and from RNC 10. RNC 10 communicates with SGSN 12 which communicates with GGSN 14. Finally, GGSN 14 is communicates between SGSN 12 and Internet 16.

Furthermore, in an aspect of this disclosure, Node-B's 6 and 8 and RNC 10 may be part of UMTS Terrestrial Radio Access Network (UTRAN). Additionally, SGSN 12 and GGSN 14 may be part of the Core Network (CN).

In an aspect of this disclosure, UE 4 may be a mobile handsets carried by end users. The UTRAN allows connectivity between a UE and the CN. The CN may consist of two components: base stations, called Node-Bs, and Radio Network Controllers (RNC), which control multiple Node-Bs. UTRAN features such as packet scheduling, radio resource control, and handover control may be implemented at RNC 10. The CN operates, in particular GGSN 14, to serve as a gateway hiding UMTS internal infrastructures from the external network, such as Internet 16.

In an aspect of this disclosure, Node-Bs 6 and 8 may be, as used in UMTS, equivalent to the base transceiver station (BTS) description used in the Global System for Mobile Communications (GSM). In contrast with GSM base stations, Node-Bs 6 and 8 may use Wideband Code Division Multiple Access or Time Division Synchronous Code Division Multiple Access (WCDMA/TD-SCDMA) as an air interface technology. As in all cellular systems, such as UMTS and GSM, the Node-Bs 6 and 8 have radio frequency transmitters and receivers used to communicate directly with mobile devices.

In an aspect of this disclosure, RNC 10 is a governing element in a UMTS radio access network and is responsible for controlling Node Bs 6 and 8 that are connected to it. RNC 10 carries out radio resource management, some of the mobility management functions, and is the point where encryption is done before user data is sent to and from the mobile.

The illustration of wireless network 2 in FIG. 1 is not meant to imply physical or architectural limitations to the manner in which an aspect of this disclosure may be implemented. Other components in addition and/or in place of the ones illustrated may be used. Some components may be unnecessary in an aspect of this disclosure.

An aspect of this disclosure recognizes and takes into account that internet quality of service based (QoS-based) throughput-sensitive applications such as Skype or GoogleTalk (voice-/video-call VoIP applications) may adapt coding rates depending on underlying link level performance of the currently chosen radio link. However, this coding rate adaption on application layer happens only in the area of several seconds which during that duration leads to disruption of audio and/or video quality.

As the cellular technology is evolving into 4G, e.g. LTE, network throughput will continue to increase so that user will be able to not only run non real-time applications, e.g. webbrowsing, but also real-time applications, e.g. VoIP (video) call, etc.

However, the main metric used to determine the cellular connection quality is still "signal strength", which does not reflect the impact of client or network traffic load, and there is lack of mechanisms to monitor and determine whether the cellular connection is capable of supporting real-time applications or not at any particular time or/and location.

One or more aspects of this disclosure provide middleware functionality ("Connection Manager (CM)") sitting in-between the wireless radios (Wi-Fi and Cellular) and the internet QoS based application to monitor cellular throughout capabilities and status in uplink and in downlink.

This information may be forwarded to the throughput-sensitive application, and can be used for preventive measures on application layer such as early coding rate adaption or prioritizing critical data to be sent/received (e.g. voice packets higher prior than video packets).

This information may also be used by CM to decide whether to move an active IP flow, e.g. VoIP call, from WLAN to WWAN, when the LTE Release-10 Seamless Offload and IP Flow Mobility mechanism as specified in 3GPP TS 24.303 is used. For example, if the Cellular connection is not capable of supporting VoIP application, the VoIP traffic may stay on the Wi-Fi connection even if its performance is degrading.

Figure 2:
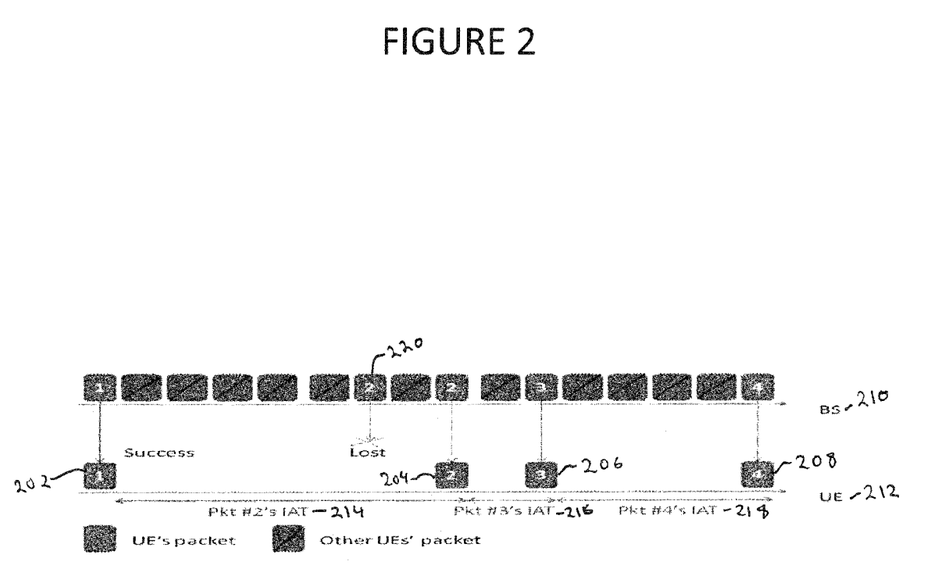
FIG. 2 is an illustration of inter arrival time in accordance with an aspect of this disclosure.

In order to assess the conditions of the cellular modem at any time, and whether this has any implications on the QoS based application, the following metrics may be evaluated by the middleware:

The delay (non-RAT specific):
a. Inter Arrival Time in the downlink and
b. Inter Departure Time & Intra Packet Delay in the uplink.
The throughput (RAT specific) for:
Downlink
a) 3G HSDPA→see below 'T-Put over Time'
b) LTE→see below 'T-Put over Time'
Uplink
a) 3G Rel'99→on MAC level: TCFI+re-transmission
b) 3G HSUPA→on MAC level: TCFI+re-transmission
c) LTE FIG. 2 is an illustration of inter arrival time in accordance with an aspect of this disclosure. Received packets 202, 204, 206, 208 may be packets that are sent from base station 210 to user equipment 212.

Inter arrival time (IAT) 214, 216, 218 may be the interval between two successively received packets. For example, inter arrival time 214 is between received packets 202 and 204. IAT may help indicate how many users are using the radio resource simultaneously. For example, inter-arrival time of an individual user may increase as more and more users are using the resource.

Additionally, packet 220 is a lost packet. A lost packet does not factor into the inter-arrival time until the packet has a successful transfer.

Figure 3:
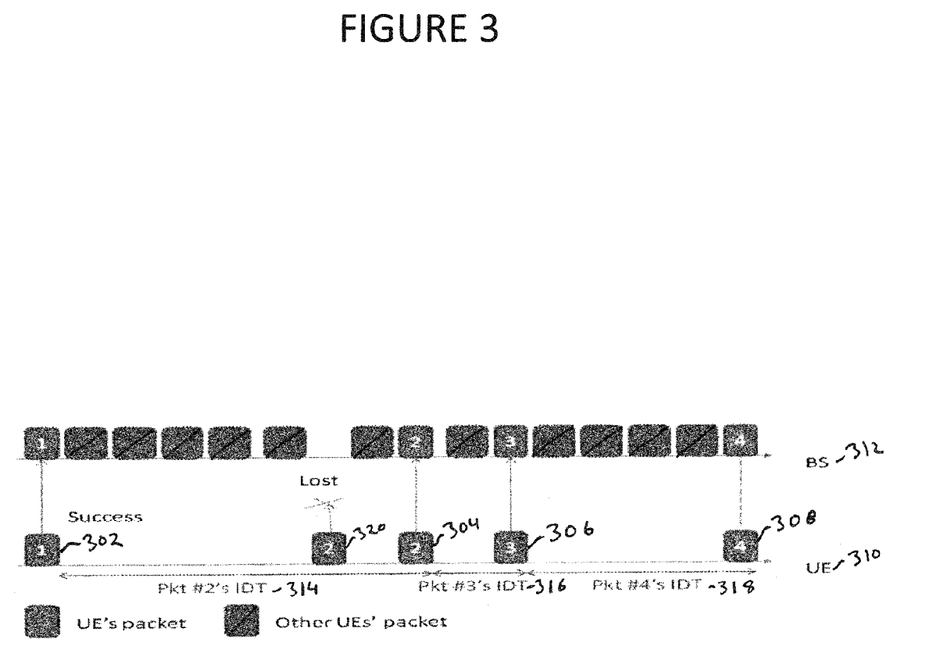
FIG. 3 is an illustration of inter departure time in accordance with an aspect of this disclosure.

FIG. 3 is an illustration of inter departure time in accordance with an aspect of this disclosure. Sent packets 302, 304, 306, 308 may be packets that are sent from user equipment 310 to base station 312.

Inter departure time (IDT) 314, 316, 318 may be the interval between two successively sent packets. For example, inter departure time 314 is between sent packets 302 and 304.

Additionally, packet 320 is a lost packet. A lost packet does not factor into the inter-arrival time until the packet has a successful transfer.

Figure 4:
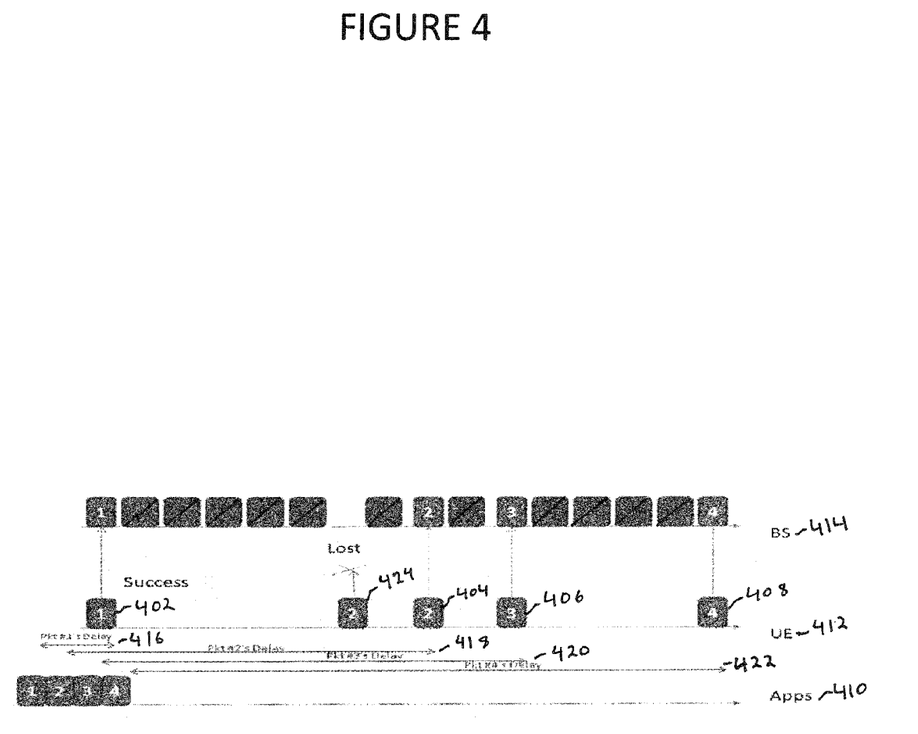
FIG. 4 is an illustration of intra packet delay in accordance with an aspect of this disclosure.

FIG. 4 is an illustration of intra packet delay in accordance with an aspect of this disclosure. Packets 402, 404, 406, 408 may be packets that are sent from the application layer 410 of the user equipment to the modem 412 of the user equipment, then forwarded to the base station 414. The interval between a packet arriving and the packet being successfully transmitted is a quality of service metric for real-time applications, e.g. VoIP.

Intra packet delay (IDP) 416, 418, 420, 422 may be the interval between a packet sent from application layer 410 to modem 412 and then modem 412 sending the packet to base station 414. For example, Intra packet delay 416 is between sent packet 402 from application layer 410 and then packet 402 being sent from modem 414. The IPD will increase if application layer 410 is sending packets to modem 412 faster than modem 412 can send the packets to base station 414.

Additionally, packet 424 is a lost packet. A lost packet does not factor into the inter-arrival time until the packet has a successful transfer.

Figure 5:
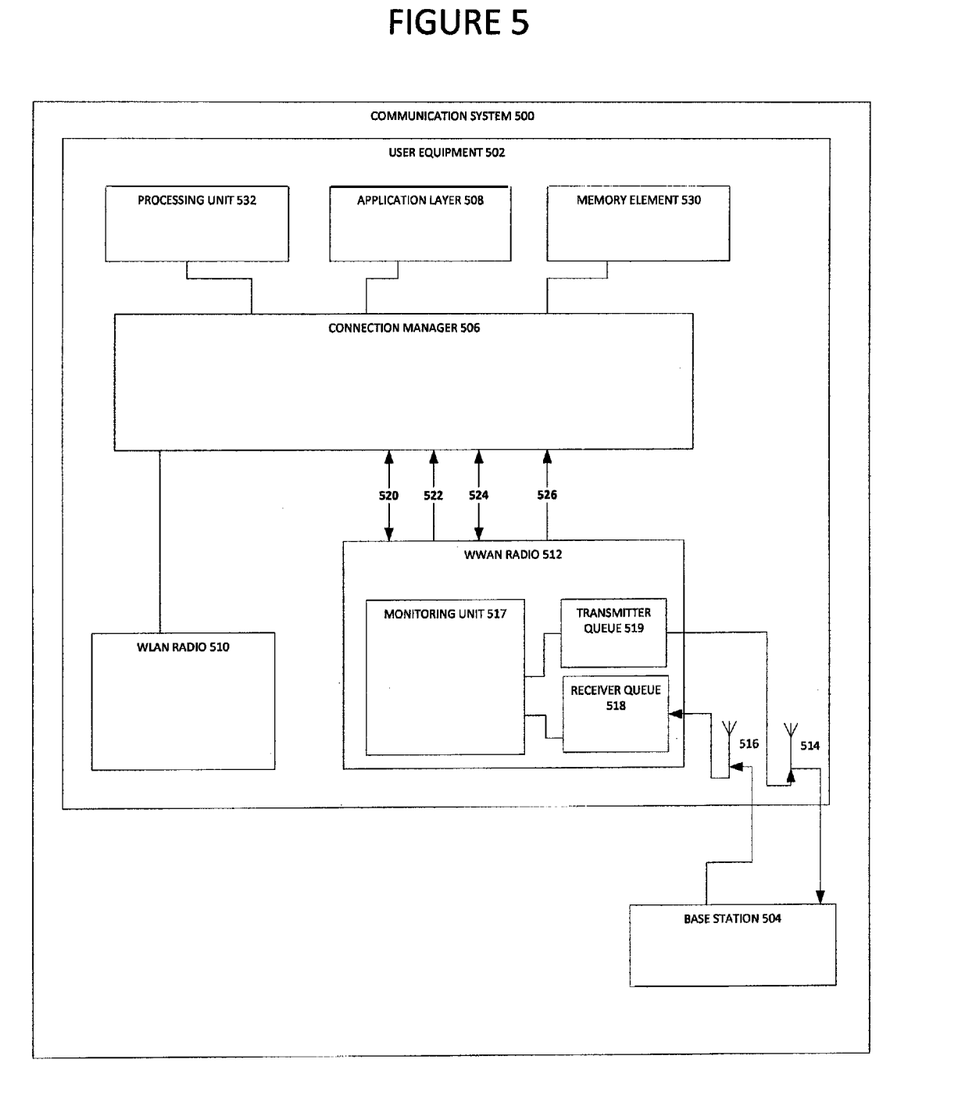
FIG. 5 is a block diagram of a communication system in accordance with an aspect of this disclosure.

FIG. 5 is a block diagram of a communication system in accordance with an aspect of this disclosure. Communication system 500 may include user equipment 502 and base station 504. User equipment 502 may include connection manager 506, application layer 508, WLAN radio 510, WWAN radio 512, uplink antenna 514, and downlink antenna 516.

Connection manager 506 may be configured to identifying a number of values. For example, connection manager 506 may be configured to identify the inter departure time, inter arrival time, intra packet delay, and other desirable values. Connection manager 506 may identifying the values based on information received from the application layer 508 and WWAN radio 512 in user equipment 502.

WWAN radio 512 has a monitoring unit 517, receiver queue 518, and transmitter queue 519. Monitoring unit 517 may monitoring the receiver queue 518, transmitter queue 519, uplink antenna 514, and downlink antenna 516 to identify throughputs in the uplink and downlink. Monitoring unit 517 may then transmit the throughputs as information to connection manager 506.

The connection manager 506 and WWAN radio 512 have a number of communications 520, 522, 524, 526 with each other. These communications help identify congestion in the network or local device. To the term "congestion" may indicate an overload in the network. Additionally, the term "congestion" may also indicate a condition on the air interface (e.g. degraded radio conditions means bigger delay). The term "congestion" may refer to any aspect of the air interface and/or devices in the communication system that may affect departure and arrival delays.

Communication 520 may be a pro-active communication in the downlink. The maximum throughput user equipment 502 is capable of at any given time may be extracted from URRC-DC Radio Bearer configuration. The configuration may include the number of resource blocks, TrCh configuration, modulation scheme, and/or spreading code. The maximum throughput may also be polled in a fixed interval (for example, every second) when being in a cellular active mode. The throughput may also be requested in a stand-alone request during a Wi-Fi to cellular handover scenario.

Communication 522 may be a reactive communication in the downlink. When the data coming from the wireless link and being sent to the application layer 508 is at a low throughput, a notification may be sent to the connection manager 506 which can be extracted from the RLC receiver queue 518. In another aspect, the monitoring unit 517 may send an unsolicited notification to be received by the connection manager 506.

Communication 524 may be a pro-active communication in the uplink. The maximum throughput user equipment 502 is capable of at any given time may be extracted from URRC-DC Radio Bearer configuration. The configuration may include the number of resource blocks, TrCh configuration, modulation scheme, and/or spreading code. The maximum throughput may also be polled in a fixed interval (for example, every second) when being in a cellular active mode. The throughput may also be requested in a stand-alone request during a Wi-Fi 33 to cellular handover scenario.

Communication 526 may be a reactive communication in the uplink. When the data coming from the wireless link and being sent to the application layer 508 is at a low throughput, a notification may be sent to the connection manager 506 which can be extracted from the RLC transmitter queue 519. In another aspect, the monitoring unit 517 may send an unsolicited notification to be received by the connection manager 506.

Additionally, user equipment 502 may include one or more memory elements (e.g., memory element 530) for storing information to be used in achieving operations associated with applications management, as outlined herein. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory or storage items discussed herein should be construed as being encompassed within the broad term 'memory element' as used herein.

Furthermore, the operations for managing congestion of user equipment 502 herein may be implemented by logic encoded in one or more tangible media, which may be inclusive of non-transitory media (e.g., embedded logic provided in an application specific integrated circuit (ASIC), digital signal processor (DSP) instructions, software potentially inclusive of object code and source code to be executed by a processor or other similar machine, etc.). In some of these instances, one or more memory elements (e.g., memory element 530) can store data used for the operations described herein. This includes the memory elements being able to store software, logic, code, or processor instructions that are executed to carry out the activities described herein.

Additionally, user equipment 502 may include processing unit 532. Processing unit 532 may be a processor, multi-core processor, single core process, micro controller, controller circuit, or any other type of processing device. A processing unit can execute any type of instructions associated with the data to achieve the operations detailed herein. In one aspect of this disclosure, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

The illustration of communication system 500 in FIG. 5 is not meant to imply physical or architectural limitations to the manner in which an aspect of this disclosure may be implemented. Other components in addition and/or in place of the ones illustrated may be used. Some components may be unnecessary in an aspect of this disclosure The foregoing has outlined rather broadly the features and technical advantages of the different aspects of this disclosure in order for the detailed description that follows may be better understood. Additional features and advantages of the aspects of this disclosure will be described hereinafter. It should be appreciated by those skilled in the art that the conception and the specific aspects disclosed may be readily utilized as a basis for modifying or redesigning other structures or processes for carrying out the same purposes of the different aspects of this disclosure. It should also be realized by those skilled in the art that such equivalent constructions do not depart form the spirit and scope as set forth in the appended claims.

Figure 6:
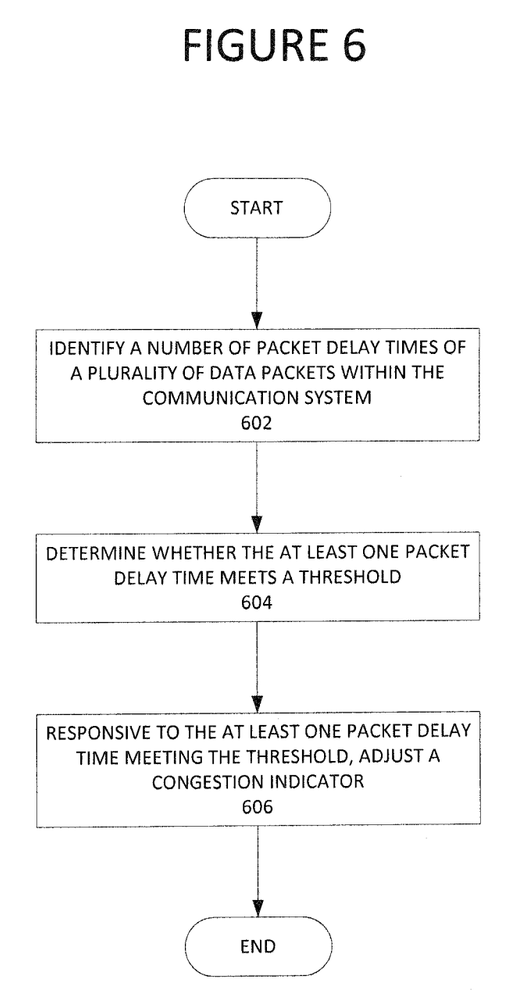
FIG. 6 is a flowchart for identifying network congestion in a communication system in accordance with an aspect of this disclosure.

FIG. 6 is a flowchart for identifying network congestion in a communication system in accordance with an aspect of this disclosure. Process 600 may be implemented in communication system 500 from FIG. 5.

In an aspect of this disclosure, process 600 begins with identifying a number of packet delay times of a plurality of data packets within the communication system (step 602). The packet delay times may be inter arrival times, inter departure times, and/or intra packet delay times.

Then, the process determines whether the at least one packet delay time meets a threshold (step 604). In different aspects, the threshold may be a high or low threshold. If the threshold is a high threshold, the process may determine whether any of the at least one packet delay time is greater than the threshold. If the threshold is a low threshold, then the process may determine whether a number of consecutive packet delay times of the at least one packet delay time is less than the threshold.

Next, the process adjusts a congestion indicator in response to the at least one packet delay time meeting the threshold (step 606). If any of the packet delays are greater than the high threshold, then the process sets the congestion indicator to active. If the number of consecutive packet delay times of the at least one packet delay time is less than the threshold, then the process sets the congestion indicator to active.

Thereafter, the process terminates.

Figure 7:
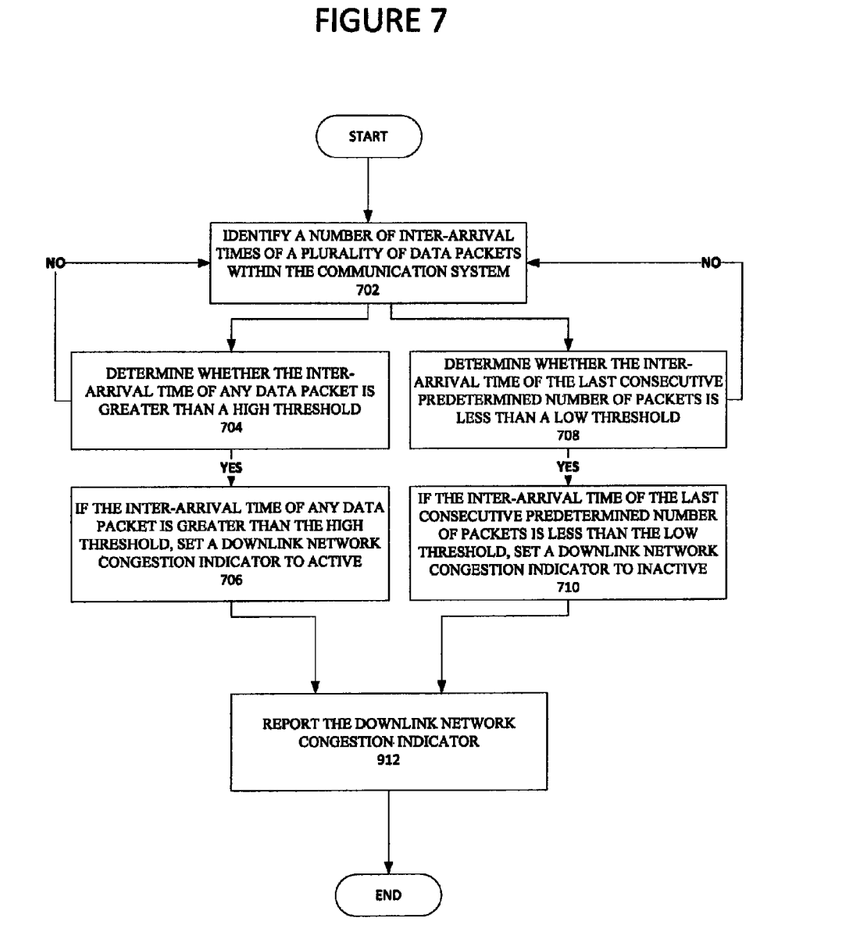
FIG. 7 is a flowchart for monitoring the inter-arrival time of receiving packets in accordance with an aspect of this disclosure.

FIG. 7 is a flowchart for monitoring the inter-arrival time of receiving packets in accordance with an aspect of this disclosure. Process 700 may be implemented in communication system 500 from FIG. 5.

Process 700 begins with identifying a number of inter-arrival times of a plurality of data packets within the communication system (step 702). The inter-arrival times may be the time periods between successfully received packets at the user equipment.

Next, the process determines whether the inter-arrival time of any data packet is greater than a high threshold (step 704). The inter-arrival time of the data packet may be calculated relative to the previous data packet. If the inter-arrival time of any data packet is greater than the high threshold, set a downlink network congestion indicator to active (step 706). Active indicates that there is congestion. When setting the congestion to active, a bit may be set to 1 or 0 to indicate an active bit.

The, the process determines whether the inter-arrival time of the last consecutive predetermined number of packets is less than a low threshold (step 708). If the inter-arrival time of the last consecutive predetermined number of packets is less than the low threshold, set a downlink network congestion indicator to inactive (step 710). Inactive indicates that there is no longer a congestion. Instead of using the low threshold, the process may use the high threshold again. When setting the congestion to inactive, a bit may be set to 1 or 0, whichever has been set as the inactive bit designation. The predetermined number of packets may represent a downlink network congestion detection packet threshold. The predetermined number of packets may indicate the number of packets needed to identify that the congestion is no longer present in the network.

Additionally, a modem of the user equipment may report the downlink network congestion indicator (step 712). The modem may report the indicator immediately. In other aspects, the modem may report the indicator to the connection manager and the report may be done during a reporting window. In one or more aspects, the modem may also report the downlink maximum throughput, downlink minimum throughput, downlink average throughput, or any combination of these values. These values may be reported during the reporting window. The downlink reporting window may be a number of units with each unit having a time interval. For example, the window may be ten intervals of 100 ms for each interval. Each value may be measured during the time interval and maximum, minimum, and average may be computed during the last interval of the window. Thereafter, the process terminates.

Figure 8:
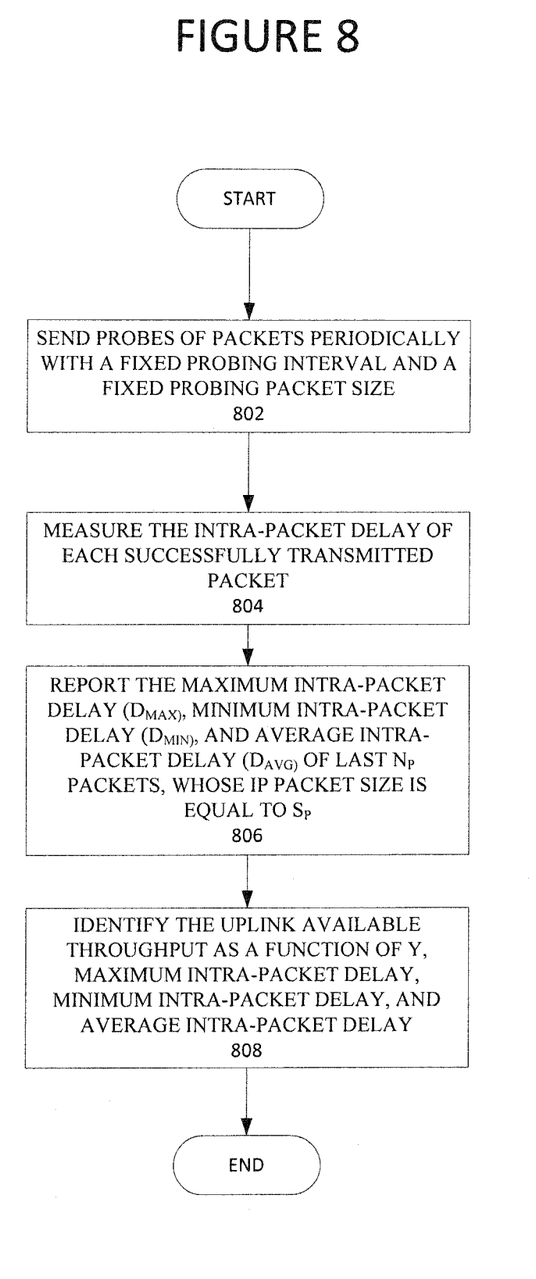
FIG. 8 is a flowchart for estimate the available bandwidth using low duty-cycle probes in accordance with an aspect of this disclosure.

FIG. 8 is a flowchart for estimate the available bandwidth using low duty-cycle probes in accordance with an aspect of this disclosure. Process 800 may be implemented in communication system 500 from FIG. 5.

Process 800 begins with a connection manager sending probes of packets periodically with fixed probing interval and fixed probing packet size (step 802). The probes may be sent in any number of intervals. In one or more aspects, the probes are sent every 4 seconds. The probing packet size may be set to any fixed size. In one or more aspects, the fixed probing packet size may be set to 500 bytes.

Next, the cellular modem measures the intra-packet delay of each successfully transmitted packet (step 804).

Then, the process reports the maximum intra-packet delay ($D_{max}$), minimum intra-packet delay ($D_{min}$), and average intra-packet delay ($D_{avg}$) of last $N_p$ packets, whose IP packet size is equal to $S_p$ (step 806). The variables $N_p$ and $S_p$ may be set dynamically, by a user, or preprogrammed.

Next, the connection manager identifies the uplink available throughput as a function of Y, maximum intra-packet delay, minimum intra-packet delay, and average intra-packet delay (step 808). In an aspect, the uplink available for throughput may be $S_p/D_{max}$.

The connection manager may reconfigure $N_p$ and $S_p$. The connection manager may also start or stop the algorithm through the AT command. When the algorithm is started, the modem should report $D_{max}$, $D_{min}$, and $D_{avg}$ through the AT command for every $N_p$ packets whose size is equal to $S_p$. If $S_p$ is set to "0", the algorithm will measure all packets regardless of their packet size. Thereafter, the process terminates.

Figure 9:
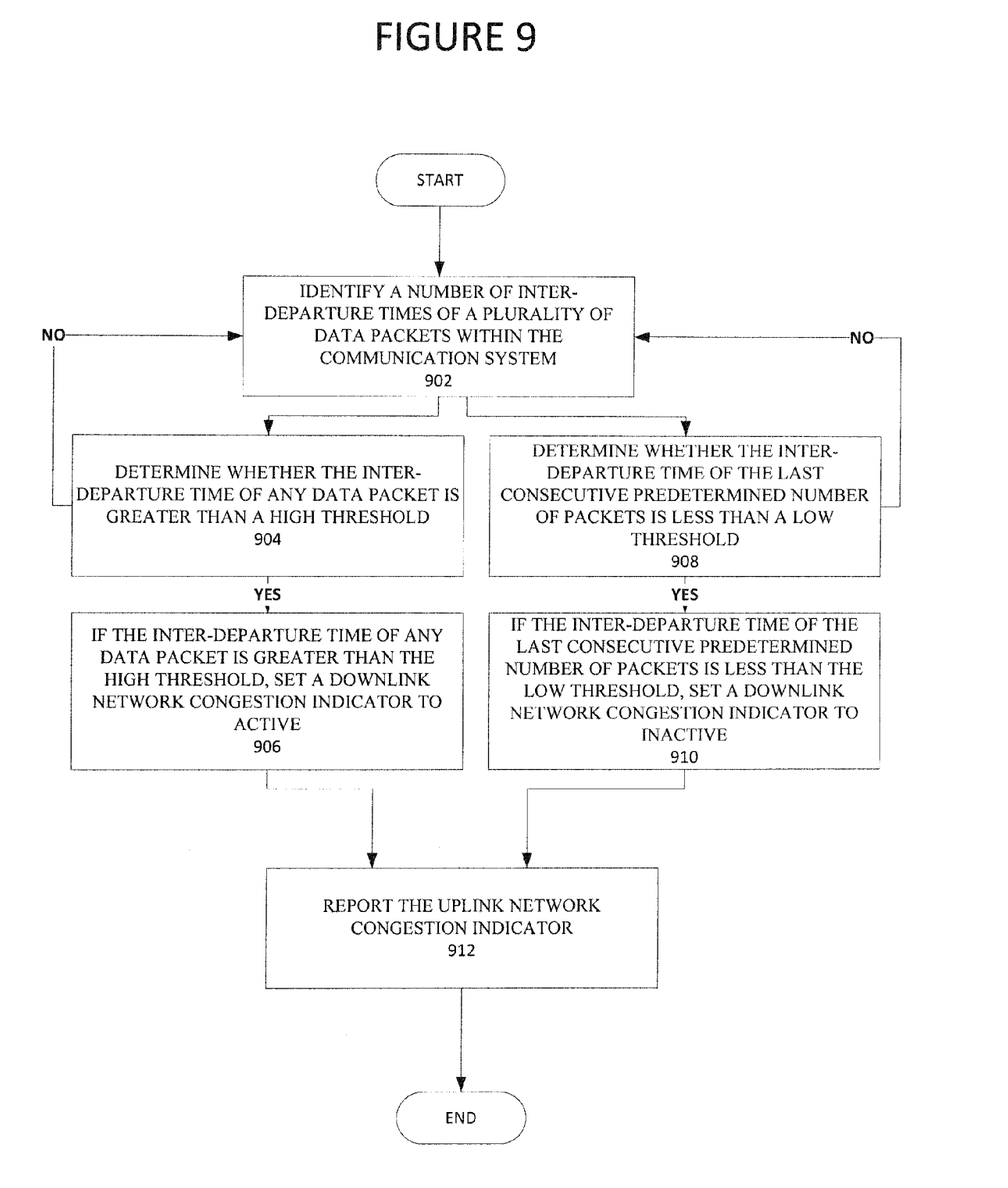
FIG. 9 is a flowchart for monitoring the inter-departure time of sent packets in accordance with an aspect of this disclosure.

FIG. 9 is a flowchart for monitoring the inter-departure time of sent packets in accordance with an aspect of this disclosure. Process 900 may be implemented in communication system 500 from FIG. 5.

Process 900 begins with identifying a number of inter-departure times of a plurality of data packets within the communication system (step 902). The inter-departure times may be the time periods between consecutive successfully transmitted packets from the user equipment.

Determine whether the inter-departure time of any data packet is greater than a high threshold (step 904). The inter-departure time of the data packet may be calculated relative to the previous data packet. If the inter-departure time of any data packet is greater than the high threshold, set a uplink network congestion indicator to active (step 906). Active indicates that there is congestion. When setting the congestion to active, a bit may be set to 1 or 0, whichever has been set as the active bit designation.

Determine whether the inter-departure time of the last consecutive predetermined number of packets is less than a low threshold (step 908). If the inter-departure time of the last consecutive predetermined number of packets is less than the low threshold, set an uplink network congestion indicator to inactive (step 910). Inactive indicates that there is no longer congestion. Instead of using the low threshold, the process may use the high threshold again. When setting the congestion to inactive, a bit may be set to 1 or 0 whichever has been designated as the inactive bit. The predetermined number of packets may represent an uplink network congestion detection packet threshold. The predetermined number of packets may indicate the number of packets needed to identify that the congestion is no longer present in the network.

Additionally, a modem of the user equipment may report the uplink network congestion indicator (step 912). The modem may report the indicator immediately. In other aspects, the modem may report the indicator to the connection manager and the report may be done during a reporting window. In one or more aspects, the modem may also report the uplink maximum throughput, uplink minimum throughput, uplink average throughput, uplink latest throughput, or any combination of these values. These values may be reported during the reporting window. The uplink reporting window may be a number of units with each unit having a time interval. For example, the window may be ten intervals of 100 ms for each interval. Each value may be measured during the time interval and maximum, minimum, and average may be computed during the last interval of the window. Thereafter, the process terminates.

Figure 10:
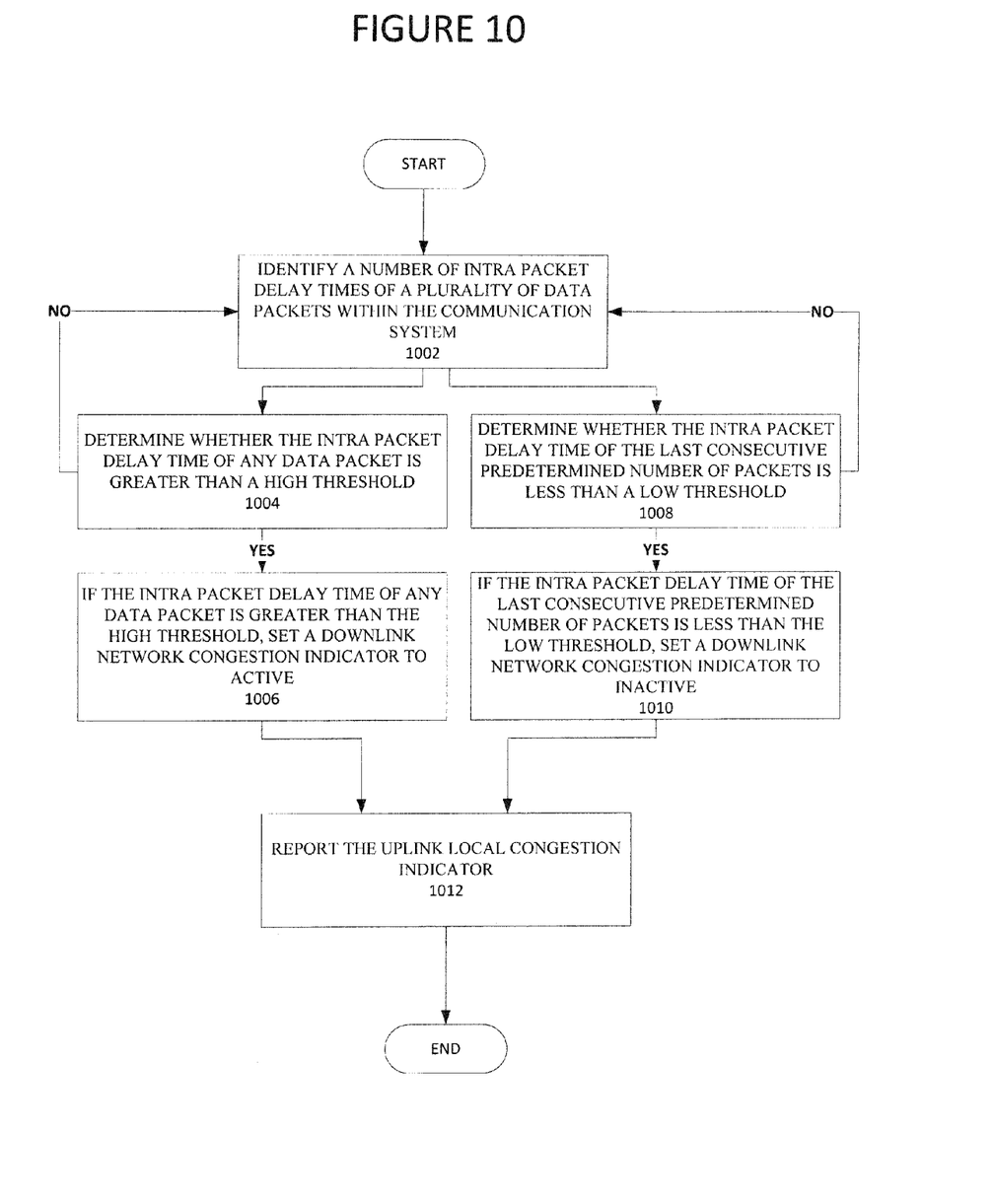
FIG. 10 is a flowchart for monitoring the intra-packet delay time of packets in accordance with an aspect of this disclosure.

FIG. 10 is a flowchart for monitoring the intra-packet delay time of packets in accordance with an aspect of this disclosure. Process 1000 may be implemented in communication system 500 from FIG. 5.

Process 1000 begins with identifying a number of intra-packet delay times of a plurality of data packets within the communication system (step 1002). The intra-packet delay times may be the time intervals between a packet arriving at the modem and the packet being successfully transmitted.

Determine whether the intra-packet delay time of any data packet is greater than a high threshold (step 1004). The intra-packet delay time of the data packet may be calculated relative to the previous data packet. If the intra-packet delay time of any data packet is greater than the high threshold, set a uplink network congestion indicator to active (step 1006). Active indicates that there is a congestion. When setting the congestion to active, a bit may be set to 1 or 0, whichever has been set as the active bit designation.

Determine whether the intra-packet delay time of the last consecutive predetermined number of packets is less than a low threshold (step 1008). If the intra-packet delay time of the last consecutive predetermined number of packets is less than the low threshold, set an uplink local congestion indicator to inactive (step 1010). Inactive indicates that there is no longer a congestion. Instead of using the low threshold, the process may use the high threshold again. For example, the same threshold may be used for both the high and low thresholds. When setting the congestion to inactive, a bit may be set to 1 or 0, whichever has been designated as the inactive bit. The predetermined number of packets may represent an uplink local congestion detection packet threshold. The predetermined number of packets may indicate the number of packets needed to identify that the congestion is no longer present in the user equipment.

Additionally, a modem of the user equipment may report the uplink local congestion indicator (step 1012). The modem may report the indicator immediately. In other aspects, the modem may report the indicator to the connection manager and the report may be done during a reporting window. In one or more aspects, the modem may also report the uplink maximum throughput, uplink minimum throughput, uplink average throughput, uplink latest throughput, or any combination of these values. These values may be reported during the reporting window. The uplink reporting window may be a number of units with each unit having a time interval. For example, the window may be ten intervals of 100 ms for each interval. Each value may be measured during the time interval and maximum, minimum, and average may be computed during the last interval of the window. Thereafter, the process terminates.

The flowcharts and block diagrams in the different depicted aspects illustrate the architecture, functionality, and operation of some possible implementations of apparatus, methods, system, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

In an aspect of this disclosure, a method is provided for identifying network congestion in a communication system. The method comprises identifying a number of packet delay times of a plurality of data packets within the communication system; determining whether the at least one packet delay time meets a threshold; and responsive to the at least one packet delay time meeting the threshold, adjusting a congestion indicator.

In an example aspect of this disclosure, the threshold is a high threshold and wherein the step of determining comprises: determining whether any of the at least one packet delay time is greater than the threshold; and wherein the step of adjusting comprises: setting the congestion indicator to active.

In an example aspect of this disclosure, the threshold is a low threshold and wherein the step of determining comprises: determining whether a number of consecutive packet delay times of the at least one packet delay time is less than the threshold; and wherein the step of adjusting comprises: setting the congestion indicator to inactive.

In an example aspect of this disclosure, a packet delay time of the number of packet delay times is a difference in time between a set of the plurality of packets being sent from a user equipment in the communication system, wherein the congestion indicator is a network uplink congestion indicator.

In an example aspect of this disclosure, a packet delay time of the number of packet delay times is a difference in time between a set of the plurality of packets being received from a base station in the communication system, wherein the congestion indicator is a network downlink congestion indicator.

In an example aspect of this disclosure, a packet delay time of the number of packet delay times is a difference in time between a packet of the plurality of packets being received from the application layer and sent to a base station of the communication system, wherein the congestion indicator is a local uplink congestion indicator.

In an example aspect of this disclosure, the method further comprises reporting the congestion indicator to an application layer of a user equipment.

In an aspect of this disclosure, a system is provided for identifying network congestion in a communication system. The system comprises a user equipment configured to identify a number of packet delay times of a plurality of data packets within the communication system; determine whether the at least one packet delay time meets a threshold; and responsive to the at least one packet delay time meeting the threshold, adjust a congestion indicator.

In an example aspect of this disclosure, the threshold is a high threshold and wherein the step of determining comprises: determining whether any of the at least one packet delay time is greater than the threshold; and wherein the step of adjusting comprises: setting the congestion indicator to active.

In an example aspect of this disclosure, the threshold is a low threshold and wherein the step of determining comprises: determining whether a number of consecutive packet delay times of the at least one packet delay time is less than the threshold; and wherein the step of adjusting comprises: setting the congestion indicator to inactive.

In an example aspect of this disclosure, a packet delay time of the number of packet delay times is a difference in time between a set of the plurality of packets being sent from a user equipment in the communication system, wherein the congestion indicator is a network uplink congestion indicator.

In an example aspect of this disclosure, a packet delay time of the number of packet delay times is a difference in time between a set of the plurality of packets being received from a base station in the communication system, wherein the congestion indicator is a network downlink congestion indicator.

In an example aspect of this disclosure, a packet delay time of the number of packet delay times is a difference in time between a packet of the plurality of packets being received from the application layer and sent to a base station of the communication system, wherein the congestion indicator is a local uplink congestion indicator.

In an example aspect of this disclosure, the system further comprises a connection manager reporting the congestion indicator to an application layer of a user equipment.

In an aspect of this disclosure, a computer program product comprising logic encoded on a tangible media for identifying network congestion in a communication system. The logic comprising instructions for: identifying a number of packet delay times of a plurality of data packets within the communication system; determining whether the at least one packet delay time meets a threshold; and responsive to the at least one packet delay time meeting the threshold, adjusting a congestion indicator.

In an example aspect of this disclosure, the threshold is a high threshold and wherein the instructions for determining comprise instruction for: determining whether any of the at least one packet delay time is greater than the threshold; and wherein the instructions for adjusting comprise instruction for: setting the congestion indicator to active.

In an example aspect of this disclosure, the threshold is a low threshold and wherein the instructions for determining comprise instruction for: determining whether a number of consecutive packet delay times of the at least one packet delay time is less than the threshold; and wherein the instructions for adjusting comprise instruction for: setting the congestion indicator to inactive.

In an example aspect of this disclosure, a packet delay time of the number of packet delay times is a difference in time between a set of the plurality of packets being sent from a user equipment in the communication system, wherein the congestion indicator is a network uplink congestion indicator.

In an example aspect of this disclosure, a packet delay time of the number of packet delay times is a difference in time between a set of the plurality of packets being received from a base station in the communication system, wherein the congestion indicator is a network downlink congestion indicator.

In an example aspect of this disclosure, the logic further comprises instructions for reporting the congestion indicator to an application layer of a user equipment.

What is claimed is:

1. A method of determining connection quality in a communication system, the method comprising:
   measuring a plurality of packet delay times associated with a plurality of data packets within the communication system; and
   determining the connection quality based on the plurality of packet delay times;
   wherein the step of determining the connection quality comprises:
   determining whether each of a number of consecutive packet delay times of the plurality of packet delay times is less than a second threshold; and wherein the method further comprises adjusting a congestion indicator to inactive if each of the number of consecutive packet delay times of the plurality of packet delay times is less than the second threshold.

2. The method of claim 1, wherein the step of determining the connection quality comprises:
   determining whether any of the plurality of packet delay times is greater than a first threshold; and the method further comprises adjusting a congestion indicator to active if any of the plurality of packet delay times is greater than the first threshold.

3. The method of claim 1, wherein the plurality of packet delay times each comprise a difference in time between two packets being sent from a user equipment in the communication system.

4. The method of claim 1, wherein the plurality of packet delay times each comprise a difference in time between two packets being received from a base station in the communication system.

5. The method of claim 1, wherein the plurality of packet delay times each comprise a difference in time between one packet being received from an application layer and being sent to a base station of the communication system.

6. The method of claim 1, further comprising:
   reporting the connection quality to an application layer of a user equipment.

7. A system for determining connection quality in a communication system, the system comprising:
   means for measuring a plurality of packet delay times associated with a plurality of data packets within the communication system; and
   means for determining the connection quality based on the plurality of packet delay time;
   wherein the means for determining the connection quality comprises determines whether each of a number of consecutive packet delay times of the plurality of packet delay times is less than a second threshold; and wherein the system further comprises means for adjusting a congestion indicator to inactive if each of the number of consecutive packet delay times of the plurality of packet delay times is less than the second threshold.

8. The system of claim 7, wherein the means for determining the connection quality determines whether any of the plurality of packet delay times is greater than a first threshold; and the system further comprises means for adjusting a congestion indicator to active if any of the plurality of packet delay times is greater than the first threshold.

9. The system of claim 7, wherein the plurality of packet delay times each comprise a difference in time between two packets being sent from a user equipment in the communication system.

10. The system of claim 7, wherein the plurality of packet delay times each comprise a difference in time between two packets being received from a base station in the communication system.

11. The system of claim 7, wherein the plurality of packet delay times each comprise a difference in time between one packet being received from an application layer and being sent to a base station of the communication system.

12. The system of claim 7, further comprising:
   means for reporting the connection quality to an application layer of a user equipment.

13. A computer program product comprising logic encoded on a non-transitory computer-readable tangible media for determining connection quality in a communication system, the logic comprising instructions for:
   measuring a plurality of packet delay times associated with a plurality of data packets within the communication system; and
   determining the connection quality based on the plurality of packet delay time;
   wherein the instructions for determining the connection quality comprise instructions for:
   determining whether each of a number of consecutive packet delay times of the plurality packet delay times is less than a second threshold; and wherein the computer program product further comprises instructions for adjusting a congestion indicator to inactive if each of the number of consecutive packet delay times of the plurality of packet delay times is less than the second threshold.

14. The computer program product of claim 13, wherein the instructions for determining the connection quality comprise instructions for:
   determining whether any of the plurality of packet delay times is greater than a first threshold; and the computer program product further comprises instructions for adjusting a congestion indicator to active if any of the plurality of packet delay times is greater than the first threshold.

15. The computer program product of claim 13, wherein the plurality of packet delay times each comprise a difference in time between two packets being sent from a user equipment in the communication system.

16. The computer program product of claim 13, wherein the plurality of packet delay times each comprise a difference in time between two packets being received from a base station in the communication system.

17. The computer program product of claim 13, wherein the plurality of packet delay times each comprise a difference in time between one packet being received from an application layer and being sent to a base station of the communication system.

18. The computer program product of claim 13, further comprising instructions for:
   reporting the connection quality to an application layer of a user equipment.

\* \* \* \* \*